United States Patent [19]

Reynolds et al.

[11] Patent Number: 6,051,804
[45] Date of Patent: Apr. 18, 2000

[54] PLASMA CUTTING OR ARC WELDING POWER SUPPLY WITH PHASE STAGGERED SECONDARY SWITCHERS

[75] Inventors: Jon O. Reynolds, Appleton; Joseph C. Schneider, Menasha; Stephen H. Li, Appleton, all of Wis.

[73] Assignee: Illinois Tool Works Inc., Glenview, Ill.

[21] Appl. No.: 09/124,397

[22] Filed: Jul. 29, 1998

Related U.S. Application Data

[63] Continuation of application No. 08/587,901, Jan. 16, 1996, abandoned.

[51] Int. Cl.[7] ................................................. B23K 10/00
[52] U.S. Cl. ............................ 219/121.54; 219/121.45; 219/121.57
[58] Field of Search .................. 219/121.54, 121.55, 219/121.56, 121.57, 121.48, 121.39, 75, 121.45

[56] References Cited

U.S. PATENT DOCUMENTS

| 3,792,225 | 2/1974 | Needham et al. . |
|---|---|---|
| 3,803,454 | 4/1974 | Higuchi . |
| 3,984,799 | 10/1976 | Fletcher et al. . |
| 4,409,465 | 10/1983 | Yamanoto et al. . |
| 4,433,370 | 2/1984 | Karadshel et al. . |
| 4,465,920 | 8/1984 | Hoyt, Jr. et al. . |
| 4,748,397 | 5/1988 | Ogawa et al. . |
| 4,870,248 | 9/1989 | Gilliland . |
| 4,994,646 | 2/1991 | Tabata et al. . |
| 5,310,992 | 5/1994 | Karino et al. . |
| 5,444,356 | 8/1995 | Reynolds et al. . |
| 5,615,095 | 3/1997 | Reynolds et al. . |
| 5,847,354 | 12/1998 | Daniel . |

FOREIGN PATENT DOCUMENTS

| 2053381 | 4/1992 | Canada . |
|---|---|---|
| 2708805 | 2/1995 | France . |
| 3816536 A1 | 11/1989 | Germany . |
| 57-019171 | 1/1982 | Japan . |
| 57-113739 | 7/1982 | Japan . |
| 2176951 | 1/1987 | United Kingdom . |

Primary Examiner—Mark Paschall
Attorney, Agent, or Firm—George R. Corrigan

[57] ABSTRACT

A power supply, such as a plasma cutting power supply or a welding power supply, that provides an output to a pair of output terminals is disclosed. The power supply includes a source of voltage and a plurality of choppers. The choppers are connected in parallel between the voltage source output terminals. A controller controls the choppers so that they are out-of-phase with respect to each of the other of the plurality of choppers. The choppers preferably include a freewheeling diode, an inductor and a switch. The number of choppers is approximately equal to the ratio of the open circuit voltage to the output load voltage.

17 Claims, 3 Drawing Sheets

PLASMA CUTTING OR ARC WELDING POWER SUPPLY WITH PHASE STAGGERED SECONDARY SWITCHERS

This is a continuation of application Ser. No. 08/587,901 filed on Jan. 16, 1996, now abandoned.

FIELD OF THE INVENTION

The invention relates generally to plasma arc cutting and welding power supplies and more particularly to a power supply with a plurality of secondary switchers.

BACKGROUND OF THE INVENTION

Plasma arc cutting is a process in which an electric arc is used to cut a metallic workpiece. Generally, plasma arc cutting uses an electric arc between an electrode and the metal to be cut. The arc creates a plasma that cuts the metallic workpiece.

It is generally accepted that approximately 250 volts (open circuit) is desirable to initiate a plasma arc cutting process. After the process has been initiated, the cutting arc voltage is approximately 90–125 volts. Of course, the cutting arc (load output) voltage is dependent upon the length of the cutting arc. The greater the length of the arc, the greater the load voltage, and conversely, the lesser the length of the arc the lesser the load voltage. Similarly, the cutting arc voltage varies with the magnitude of the output current.

A typical prior art plasma arc cutting power supply receives an input voltage (from a power line or generator) and provides an output voltage to a pair of output terminals, one of which is the electrode and the other of which is connected to the workpiece. The power supplies provide about 250 volts open circuit and about 90–125 volts under load. There are numerous types of known plasma arc cutting power supplies, such as magnetic power supplies, inverter power supplies, phase control power supplies, and choppers or secondary switchers. The present invention relates to chopper based power supplies.

A typical prior art chopper shown in FIG. 5 includes a voltage source 601, a switch 602, a diode 604 and an inductor 603 which provide output current to load 605. Voltage source 601 may be a transformer receiving line voltage and a rectifier. Voltage source 601 should be capable of providing input power, generally at a desired voltage level. Of course, the source need not be a constant voltage source but merely should be suitable for use with a chopper power supply. When switch 602 is on current flows from the positive output of voltage source 601 through load 605, inductor 603 and switch 602. During this time the load current (and inductor current) is increasing and inductor 603 is storing energy, dependent upon the volt seconds applied to inductor 603 while 602 is on. The volt seconds are determined by the time switch 602 is on, and the source and load voltages. When switch 602 is off current freewheels through diode 604, load 605 and inductor 603. While switch 602 is off the load current (and inductor current) is decreasing and inductor 603 is returning energy, again dependent upon the volt seconds (the time and load voltage) inductor 603 applies to diode 604 and load 605. In some high current applications a single voltage source may have more than one chopper connected in parallel. The choppers are operated in-phase with one another, thus the load current is merely twice the output current of either chopper.

The output voltage applied to load 605 is dependent upon the duration of time switch 602 is on, relative to the duration of time switch 602 is off. Specifically, the output voltage is equal to the ratio of on time of switch 602 to the on time plus off time of switch 602, multiplied by the output voltage of voltage source 601. Thus, if switch 602 is on 50% of the time the load voltage will be 50% of the source voltage. Typically, a current feedback element is used in conjunction with a control circuit to control the on and off time of switch 602.

Thus, a chopper will have a triangle (sawtooth) current output having predetermined, but variable amplitude or frequency according to the switching frequency. Their operation is based on the controlled switching of a DC voltage input to a desirable DC current output. The sawtooth output may be characterized as having a ripple current, dependent on the maximum current less the minimum current.

One drawback of chopper power supplies is the ripple current rating of the output. When in-phase parallel choppers are used, the output ripple is twice the ripple of a single chopper. In a switching type (chopper) power supply, the output cutting capability of the air plasma arc cutter is adversely affected if its ripple current capability is not adequate for the job, i.e., cutting occurs best at relatively constant current, not with a sawtooth output. The life span of input capacitors in the voltage source is also affected if the ripple current is greater than the ratings. The ripple current generates internal heat in the capacitor, with the attendant changes in temperature dependent parameters. Elevated temperatures may reduce the life expectancy of any electrochemical component. It has often proved difficult to ensure a moderate ambient temperature for capacitors, much less to aggravate the situation by permitting excessive ripple currents. Even with an appropriately rated capacitor, dangerous internal temperatures can develop when there is no provision for heat removal from the external surface of the case. Additionally, the magnitude of the peak current is dependent upon the percent of ripple. Because high peak current can erode consumables, a low ripple current is desirable.

Chopper power supplies, however, are relatively inexpensive, controllable, and not lossy. Also, choppers are well suited for receiving an input voltage, and provide a load current at a lesser output voltage. Accordingly, it is desirable to provide a chopper based power supply to take advantage of the positive aspects of choppers, yet avoid a major drawback—excessive ripple current in the load.

Welding power supplies have many similarities to plasma arc cutting power supplies. Specifically, the welding process is best initiated with a generally accepted fixed open circuit voltage (approximately 80 volts). After initiation, however, the operating load output voltage is generally in the range of 20–45 volts, and often 25 volts. Finally, as in the plasma arc cutting process the actual arc voltage varies with the current and the length of the arc.

In some welding applications it is desirable to have a single power supply provide current to a number of welding stations connected in parallel. Thus, more than one welder can use a given power supply with this sort of arrangement. Typically, to provide the necessary open circuit voltage to initiate the welding arc the power supply will be a constant voltage, 80 volts source. Each welding station includes a variable resistor in series with the welding electrode (or workpiece). The resistor dissipates sufficient power to provide a typical load output voltage, 20–45 volts, e.g. As may be readily seen this is very wasteful of power—as little as 25% of the power is delivered to the arc load, while 75% of the power is dissipated in the resistor.

Accordingly, it is desirable to provide a welding power supply that is capable of providing 80 volts open circuit and in the range of 25 volts load voltage. Preferably, such a welding power supply would be capable of providing multiple parallel welding stations, without wasting power.

SUMMARY OF THE PRESENT INVENTION

According to one embodiment of the invention a power supply, such as a plasma cutting power supply or a welding power supply, provides an output to a pair of output terminals. The power supply includes a source of voltage and a plurality of choppers. The choppers are connected in parallel between the voltage source and the output terminals. A controller controls the choppers so that they are out-of-phase with respect to each of the other of the plurality of choppers. The choppers preferably include a freewheeling diode, an inductor and a switch.

According to a second embodiment of the invention the voltage source includes a transformer for receiving line voltage and a rectifier.

According to a third aspect of the invention a user selected current input is provided and current feedback is provided. The control circuit receives the signals.

According to a third aspect of the invention there are two choppers connected in parallel, and the second chopper is controlled substantially 180° out-of-phase with respect to the first chopper.

According to a fourth aspect of the invention the control circuit includes a ramp generator for generating a first ramp signal for controlling the first chopper and a second ramp signal for controlling the second chopper wherein the first ramp signal is substantially 180° out-of-phase with respect to the second ramp signal.

According to a fifth aspect of the invention there are three choppers connected in parallel, and the choppers are controlled substantially 120° out-of-phase with respect to the other choppers.

According to a sixth aspect of the invention there are N choppers and the power supply provides an open circuit voltage (OCV) to the pair of output terminals when no load is present and a load output voltage (LOV) when a load is present. N is approximately equal to OCV/LOV.

Other principal features and advantages of the invention will become apparent to those skilled in the art upon review of the following drawings, the detailed description and the appended claims.

Figure 1:
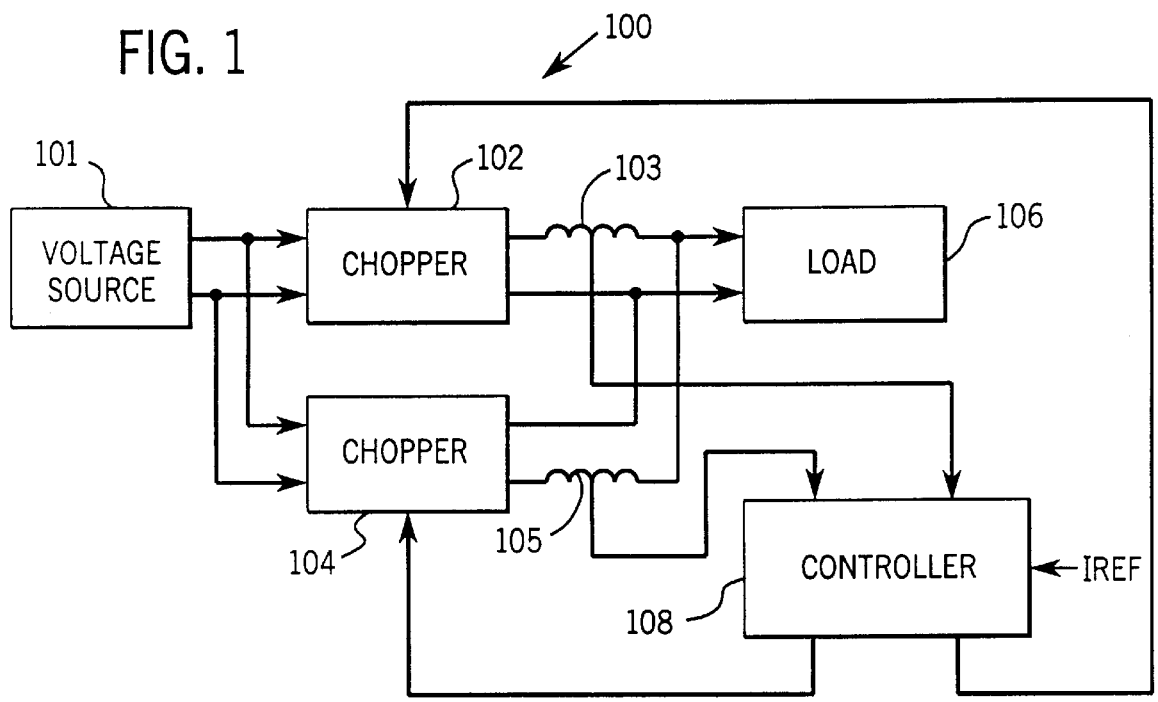
FIG. 1 is a block diagram of a power supply made in accordance with the present invention.
Figure 5:
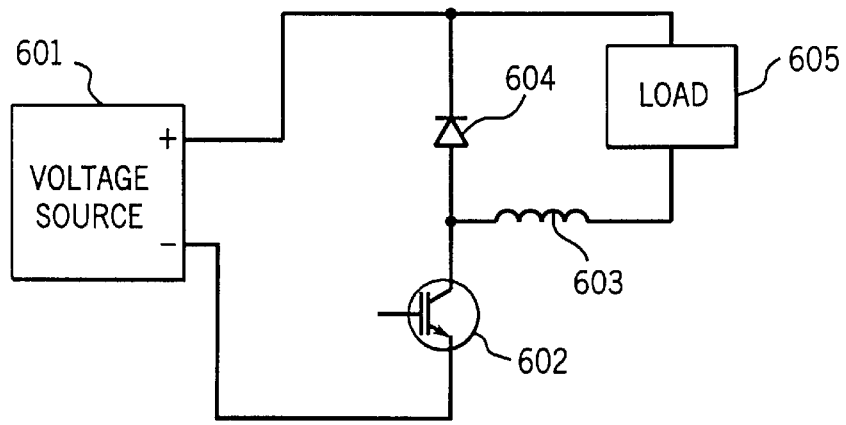
FIG. 5 is a circuit diagram of a prior art chopper.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Generally, a plasma arc cutting power supply made in accordance with the preferred embodiment is shown in FIG. 1. Plasma arc cutting power supply 100 includes a chopper 102 and a chopper 104, connected in parallel. Both choppers 102 and 104 receive an input voltage from a voltage source 101. Chopper 102 includes an output current sensing LEM 103 and chopper 104 includes an output current sensing LEM 105. The choppers outputs are provided to a load 106. A controller 108 receives a current feedback signal from LEMs 103 and 105, as well as a current reference signal. The current reference signal is a user selected current cutting magnitude and is typically provided by a potentiometer on the front panel of the plasma arc cutting power supply. Controller 108 provides a first switching signal to chopper 104 and a second switching signal to chopper 102. The switching signal determines when the switches in choppers 102 and 104 turn on.

In accordance with the present invention, choppers 102 and 104 are operated out-of-phase with respect to one another. Specifically, chopper 104 is operated 180° out-of-phase with respect to chopper 102. As will be described in greater detail below, this substantially reduces the ripple output of power supply 100.

The arrangement of FIG. 1 is of particular usefulness in plasma arc cutting power supplies because of the ratio of the desired open circuit voltage to the approximate load voltage. Specifically, the ratio is close to 2 (250 volts to 90–125 volts). Thus, if the voltage source delivers a 250 volts open circuit, a load voltage of approximately one-half that is obtained when each chopper is on approximately 50% of the time.

Figure 3:
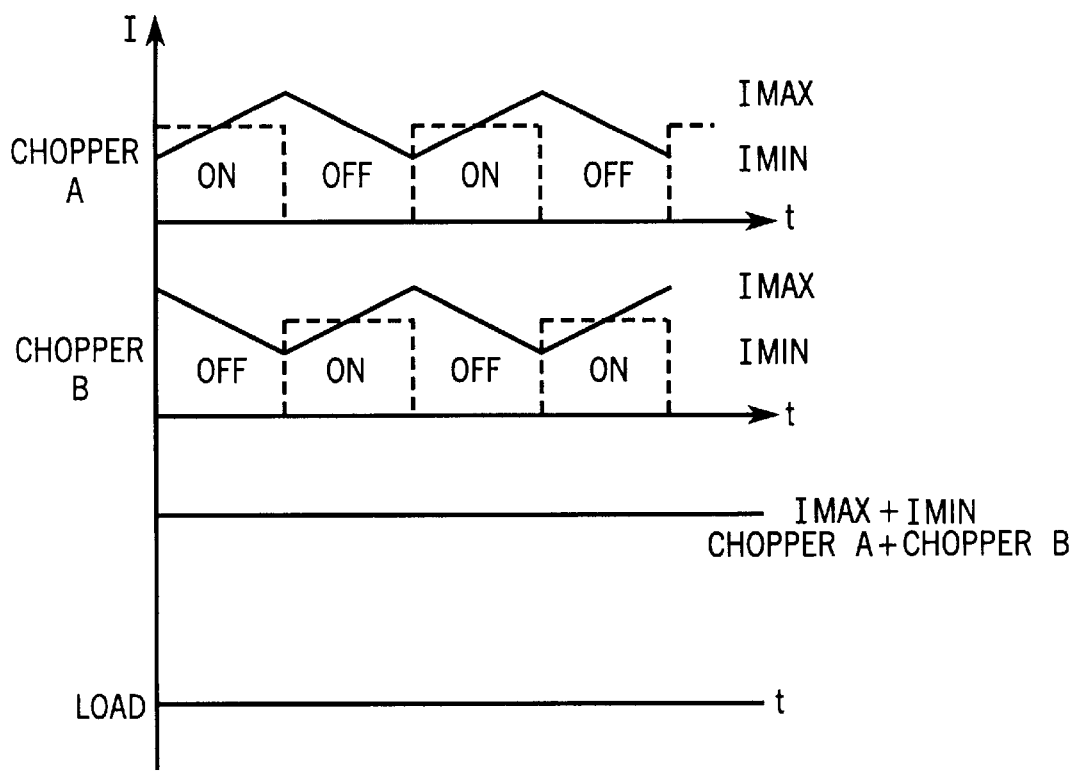
FIG. 3 is a graph showing the current in each chopper and the load current for a power supply built in accordance with the present invention used where the open circuit voltage is approximately twice the load voltage.

In accordance with the present invention, when each chopper is on 50% of the time, and out-of-phase 180° with respect to the other chopper, the output ripple is substantially zero. For example, as shown in FIG. 3, a chopper A output current and a chopper B output current are shown for the switching times designated on and off delineated by the dashed lines. The sum of these currents is the current in the load and may be seen to be substantially flat.

Figure 4:
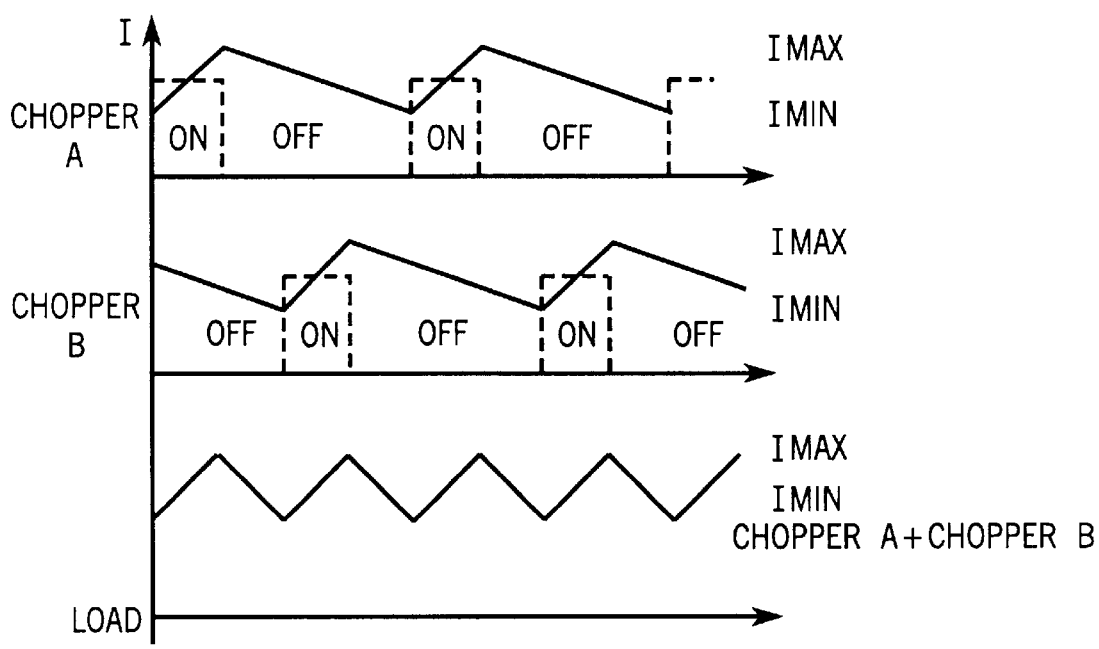
FIG. 4 is a graph showing the current in each chopper and the load current for a power supply built in accordance with the present invention used where the open circuit voltage is approximately four times the load voltage.

In practice, the plasma arc cutting process requires a load voltage of slightly less than one-half the open circuit voltage, thus each chopper will be on somewhat less than 50% of the time. FIG. 4 shows the chopper current and load current for a load output voltage of 25% of the open circuit voltage. As may be seen the load output current has a ripple (which is exaggerated for illustrative purposes) that is approximately two-thirds that of the ripple current in each chopper. Thus, a reduced ripple output is provided.

Other applications may make use of a power supply having parallel choppers out-of-phase with respect to one another. Generally, the number of choppers should be approximately equal to the ratio of the open circuit voltage to typical load output voltage. Thus, for a welding power supply having a desired open circuit voltage of 80 volts and a load voltage of approximately 25 volts, three choppers in parallel each 120° out-of-phase with respect to the other two, would be appropriate.

Figure 2:
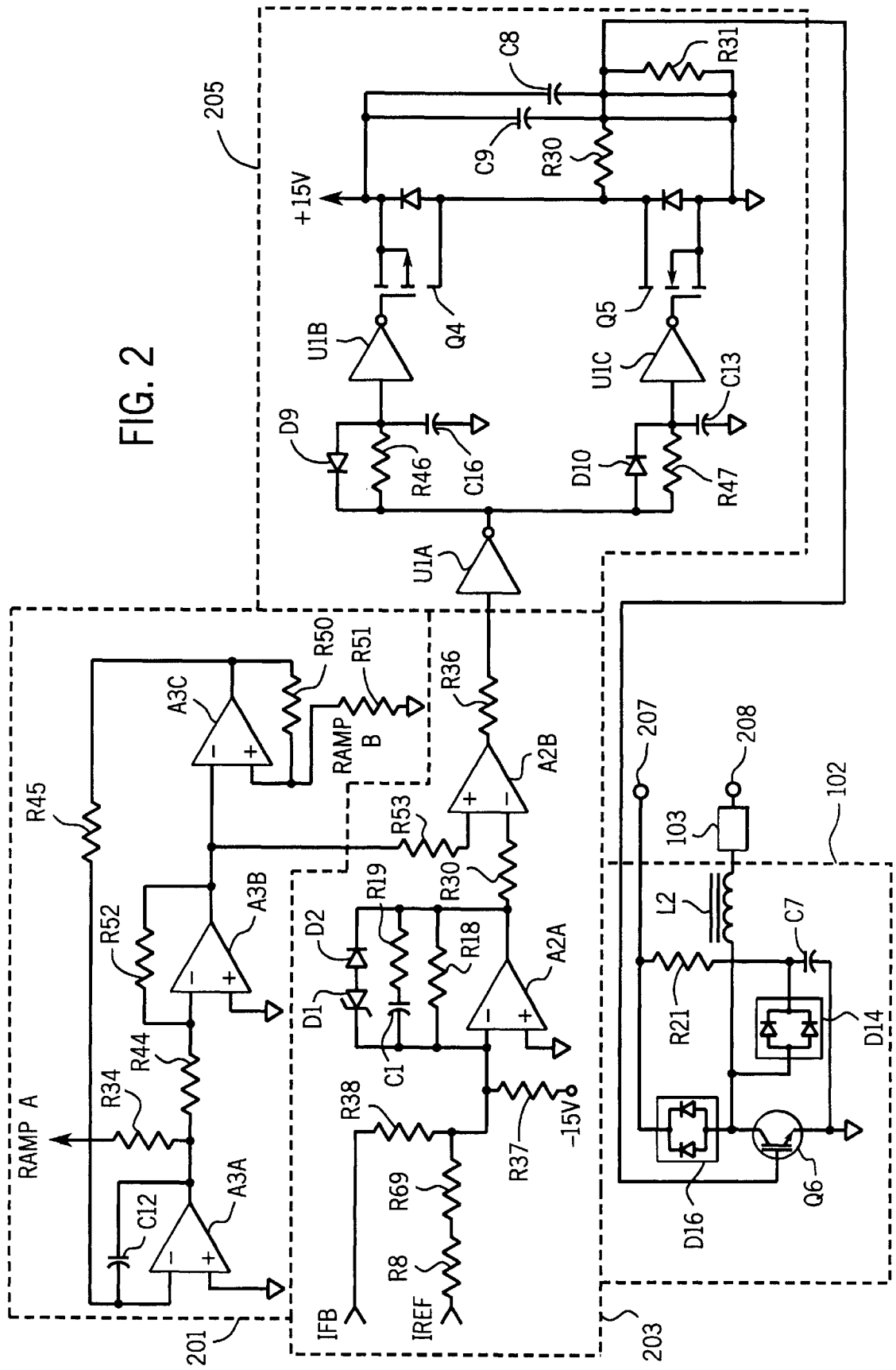
FIG. 2 is a circuit diagram of a chopper of FIG. 1 and a portion of the controller of FIG. 1.

Referring now to FIG. 2, a preferred embodiment of part of controller 108 and chopper 102 is shown. Controller 108 includes a ramp generator 201, a current error circuit 203 and a drive circuit 205. Controller 108 may include other components and portions typical in the art.

Ramp generator 201 includes a plurality of op amps A3A, A3B and A3C. Op amp A3A is configured as an integrator and includes a feedback capacitor C12 connected to the inverting input. The noninverting input of op amp A3A is connected to ground. The output of op amp A3A is provided through a resistor R44 to inverting op amp A3B. Op amp A3B includes a feedback resistor R52 connected to its inverting input and the noninverting input connected to ground. The output of op amp A3B is directly connected to the inverting input of op amp A3C which is configured as a comparator. Op amp A3C includes feedback resistors R50 and R51 connected to the noninverting input of op amp A3C. The output of A3C is provided through a resistor R45 as an input to the noninverting input of op amp A3A.

Thus, ramp generator 201 generates a sawtooth ramp at the output of A3A, through a resistor R34 (the signal is labeled RAMP A). The output of op amp A3B is RAMP B and is identical to RAMP A except that it is 180° out-of-phase with respect to RAMP A. RAMP B is provided through a resistor R53 to current error circuit 203. RAMP A and RAMP B are the timing signals used to determine the length of the off time plus on time of the switches in choppers 102 and 104.

Current error circuit 203 includes an input IFB, which is a current feedback signal derived from an LEM, such as LEM 103 on the output of chopper 102. The signal may be processed in a manner typical in the art. Current error circuit 203 also includes an IREF input, which is the user selected desired current (typically obtained using a single potentiometer on the front panel of the power supply).

The signal representative of the user selected current, IREF, is provided through a pair of resistors R8 and R69 to amplifier op amp A2A. The current feedback signal, IFB, is provided through resistor R38 to amplifier A2A. Both the current reference signal and the current feedback signal are provided to the inverting input of op amp A2A. The non-inverting input of op amp A2A is connected to ground. A negative 15 volts signal is also connected to the inverting input of amplifier A2A through resistor R37, to provide a minimum current bias.

Amplifier A2A includes feedback resistors R18, R19, C1, diodes D1 and D2 connected from its output to its inverting input. The output of amplifier A2A is thus a current error signal, i.e., representative of the difference between the reference current and the feedback current. The minimum bias current signal is provided through resistor R37 to provide a minimum current when IREF is at its minimum level.

The output of amplifier A2A is provided through a resistor R30 to the inverting input of op amp A2B. Op amp A2B is connected as a comparator and receives as a timing input RAMP B, from ramp generator 201, on its noninverting input. Thus, the output of comparator A2B is a "one" or "zero," depending upon whether the current error signal from R30 is greater or less than the timing signal (RAMP B).

The output of comparator A2B is provided through a resistor R36 to an inverter U1A. The output of inverter U1A is provided to a gate driver circuit 205. The output of inverter U1A controls, through gate driver circuit 205, when the switch in chopper 102 is on and off, dependent upon the timing signal RAMP B generated by ramp generator 201 and the difference between the current reference signal and the current feedback signal.

Gate driver circuit 205 includes totem pole MOSFETS, Q4 and Q5. The totem pole MOSFETS Q4 and Q5 are driven by the output of inverter U1A, provided through a resistor R46 and capacitor C16 to create a delay. The output of capacitor C16 is provided to an inverter U1B, which drives the gate of MOSFET Q4. A diode is provided across resistor R46. Similarly, resistor R47, diode D10, capacitor C13 and inverter U1C are provided as inputs to the gate of transistor Q5. The RC networks R46 and C16, and R47 and C13, provide a small delay before the turning on of either MOSFET Q4 or MOSFET Q5. Diodes D9 and D10 provide for the instantaneous turning off of the MOSFETS Q4 and Q5. Thus, a crowbar across MOSFETS Q4 and Q5 is avoided.

MOSFETS Q4 and Q5 are connected between a positive 15 volts source and ground. The node common to MOSFETS Q4 and Q5 is provided through a resistor R32 to chopper 102, and turns the switch in chopper 102 on and off. Resistor R32 limits the charge current into the gate of the switch in chopper 102. A resistor R31 is provided to hold the IGBT off when the machine power is off. An electrolytic capacitor C9 and a decoupling capacitor C8 are provided between the positive 15 volts power supply and ground.

As shown on FIG. 2, chopper 102 includes an IGBT Q6 (or some other switch) which receives the gate driver signal. Freewheeling diodes D16 and an inductor L2 are provided in a standard chopper configuration. Resistor R21, a diode D14 and a capacitor C7 provide a snubber for IGBT Q6. LEM 103 is shown also, and outputs, 207 and 208, are shown.

When the difference between IREF and IFB indicates additional current is needed, IGBT Q6 will stay on for a longer portion of time, thus providing additional volt seconds and allowing the current in inductor L2 and the load to rise to a greater magnitude. When less current is needed, indicated by IFB being greater than IREF, IGBT Q6 will be turned on for a lesser portion of time. Thus, the control of chopper 102 has been described.

Chopper 104 is controlled using circuitry identical to current error circuit 203 and gate driver circuit 205. However, the ramp input to the current error circuit of chopper 104 is RAMP A, not RAMP B. Thus, the output of the current error circuit that controls chopper 104 is substantially that of current error signal 203, but 180° out-of-phase. The gate driver circuit for chopper 104 (not shown) is identical to that of gate driver circuit 205. The output of the gate driver circuit (not shown) is provided to chopper 104.

Thus, as may be seen, choppers 102 and 104 are controlled to be 180° out-of-phase with respect to one another. Additionally, choppers 102 and 104 are controlled to provide a desired current to load 106.

The above preferred embodiment has been described with respect to a plasma arc cutting power supply, but will work equally well with a welding power supply. More particularly, for a welding power supply it would be desirable to provide approximately three choppers in parallel because the open circuit voltage is often approximately three times the output load voltage.

When a welding power supply is made in accordance with this invention, it is well suited for having multiple welding stations (connected in parallel). Each station would include three choppers, 120° out-of-phase with respect to the other two choppers. Such a power supply will have less ripple than a standard chopper, and less power loss than the prior art resistor based welding stations.

Thus, it should be apparent that there has been provided in accordance with the present invention a power supply with phase staggered secondary switchers that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

| REFERENCE NO. | COMPONENT TYPE | VALUE |
| --- | --- | --- |
| A2A | Linear 347 Op-Amp | |
| A2B | Linear 347 Op-Amp | |
| A3A | Linear 347 op-Amp | |
| A3B | Linear 347 Op-Amp | |
| A3C | Linear 347 Op-Amp | |
| C1 | Capacitor | 0.01 micro F |
| C7 | Capacitor | 0.01 micro F |
| C12 | Capacitor | 0.001 micro F |
| C13 | Capacitor | 100 pico F |
| C16 | Capacitor | 100 pico F |
| C9 | Electrolytic Capacitor | 10 micro F |
| C8 | Capacitor | 1 micro F |
| C35 | Capacitor | 0.1 micro F |
| C39 | Capacitor | 0.1 micro F |
| D1 | Zener Diode | 7.5 volt |
| D2 | Diode | |
| D9 | Diode | |
| D14 | Diode | |
| D16 | Diode | |
| L2 | Inductor | |
| LEM 1 | Current Transducer | |
| Q4 | P Channel MOSFET | |
| Q5 | N Channel MOSFET | |
| Q6 | IGBT | |
| R30 | Resistor | 10 K Ohm |
| R31 | Resistor | 10 K Ohm |
| R34 | Resistor | 10 K Ohm |
| R36 | Resistor | 10 K Ohm |
| R50 | Resistor | 10 K Ohm |
| R53 | Resistor | 10 K Ohm |
| R19 | Resistor | 15 K Ohm |
| R45 | Resistor | 15 K Ohm |
| R51 | Resistor | 5.11 K Ohm |
| R18 | Resistor | 2.74 M Ohm |
| R8 | Resistor | 30.1 K Ohm |
| R37 | Resistor | 30.1 K Ohm |
| R21 | Resistor | 1 K Ohm |
| R38 | Resistor | 8.25 K Ohm |
| R32 | Resistor | 15 Ohm |
| R44 | Resistor | 100 K Ohm |
| R52 | Resistor | 100 K Ohm |
| R46 | Resistor | 12.1 K Ohm |
| R47 | Resistor | 12.1 K Ohm |
| R54 | Resistor | 274 Ohm |
| R69 | Resistor | 2.21 K Ohm |
| U1A | 40106 Inverter | |
| U1B | 40106 Inverter | |
| U1C | 40106 Inverter | |

What is claimed is:

1. A plasma arc cutting power supply, having an open circuit voltage of at least about twice the load voltage, for providing an output to a pair of plasma cutting output terminals, comprising:
   a source of voltage;
   a plurality of choppers connected in parallel between the voltage source and the plasma cutting output terminals, wherein each chopper has a control input; and
   a controller having a plurality of outputs connected to one of the plurality of control inputs, wherein each of the choppers is controlled to be out-of-phase with respect to each of the other of the plurality of choppers;
   wherein the power supply provides the open circuit voltage (OCV) to the pair of output terminals when no load is present and the load output voltage (LOV) when a load is present and there are N choppers in the plurality of choppers, where N is an integer and approximately equal to OCV/LOV.

2. The apparatus of claim 1 wherein each of the choppers includes a freewheeling diode, an inductor and a switch.

3. The apparatus of claim 1 wherein the voltage source includes a transformer for receiving a line current on a primary and a rectifier connected to receive a voltage from a transformer secondary, wherein an output of the rectifier is connected to the plurality of choppers connected in parallel.

4. The apparatus of claim 2 further including:
   a user selected current input; and
   at least one current feedback element, wherein the control circuit receives a current feedback signal from the current feedback element and receives a user selected current signal from the user selected current input, and wherein each chopper operates at about a 50% or less duty cycle.

5. The apparatus of claim 4 wherein the plurality of choppers includes a first and second chopper connected in parallel, and wherein the second chopper is controlled substantially 180° out-of-phase with respect to the first chopper.

6. The apparatus of claim 5 wherein the control circuit includes a ramp generator for generating a first ramp signal for controlling the first chopper and a second ramp signal for controlling the second chopper wherein the first ramp signal is substantially 180° out-of-phase with respect to the second ramp signal.

7. A plasma arc cutting power supply, having an open circuit voltage of at least about twice the load voltage, for providing an output to a pair of output terminals, comprising:
   a source of voltage;
   a plurality of choppers connected in parallel, each of the choppers having an input in electrical communication with the voltage source, and each of the plurality of choppers having an output in electrical communication with the output terminals, wherein each chopper has a control input; and
   control means, having a plurality of outputs connected to one of the plurality of control inputs, for controlling the on and off time of the choppers wherein each of the choppers is controlled to be out-of-phase with respect to each of the other of the plurality of choppers;
   wherein the power supply provides the open circuit voltage (OCV) to the pair of output terminals when no load is present and the load output voltage (LOV) when a load is present and there are N choppers in the plurality of choppers, where N is an integer and approximately equal to OCV/LOV.

8. The apparatus of claim 7 further including:
   current selection means for providing a current reference signal to the control means; and
   at least one current feedback means for providing a current feedback signal to the control means;
   wherein the control means includes means for controlling the current output of the chopper in response to the current reference signal and the current feedback signal.

9. The apparatus of claim 8 wherein the plurality of choppers includes a first and second chopper connected in parallel, and wherein the control means includes means for controlling the second chopper such that it is substantially 180° out-of-phase with respect to the first chopper, and wherein each chopper operates at about a 50% or less duty cycle.

10. A welding power supply, having an open circuit voltage of more than about twice the load voltage, for providing an output to a pair of welding output terminals, comprising:

a source of voltage;

a plurality of choppers connected in parallel, each of the choppers having an input in electrical communication with the voltage source, and each of the plurality of choppers having an output in electrical communication with the welding output terminals, wherein each chopper has a control input; and a controller having a plurality of outputs connected to one of the plurality of control inputs, wherein each of the choppers is controlled to be out-of-phase with respect to each of the other of the plurality of choppers;

wherein the power supply provides an open circuit voltage (OCV) to the pair of output terminals when no load is present and a load output voltage (LOV) when a load is present and there are N choppers in the plurality of choppers, where N is an integer and approximately equal to OCV/LOV.

11. The apparatus of claim 10 wherein each of the choppers includes a freewheeling diode, an inductor and a switch.

12. The apparatus of claim 10 wherein the voltage source includes a transformer for receiving a line current on a primary and a rectifier connected to receive a voltage from a transformer secondary, wherein an output of the rectifier is connected to the plurality of choppers connected in parallel.

13. The apparatus of claim 11 further including:

a user selected current input; and at least one current feedback element, wherein the control circuit receives a current feedback signal from the current feedback element and receives a user selected current signal from the user selected current input.

14. The apparatus of claim 10 wherein the plurality of choppers includes a first, second and third chopper and the third chopper is operated substantially 120° out-of-phase with respect to the first and second choppers, and wherein each chopper operates at about a one-third or less duty cycle.

15. A welding power supply, having an open circuit voltage of more than about twice the load voltage, for providing an output to a pair of welding output terminals, comprising:

a source of voltage;

a plurality of choppers connected in parallel, each of the choppers having an input in electrical communication with the voltage source, and each of the plurality of choppers having an output in electrical communication with the welding output terminals, wherein each chopper has a control input; and control means, having a plurality of outputs connected to one of the plurality of control inputs, for controlling the on and off time of the choppers wherein each of the choppers is controlled to be out-of-phase with respect to each of the other of the plurality of choppers;

wherein the power supply provides an open circuit voltage (OCV) to the pair of output terminals when no load is present and a load output voltage (LOV) when a load is present and there are N choppers in the plurality of choppers, where N is an integer and approximately equal to OCV/LOV.

16. The apparatus of claim 15 further including:

current selection means for providing a current reference signal to the control means; and at least one current feedback means for providing a current feedback signal to the control means;

wherein the control means includes means for controlling the current output of the chopper in response to the current reference signal and the current feedback signal.

17. The apparatus of claim 16 wherein the plurality of choppers includes a first, second and third chopper connected in parallel, and wherein the control means includes means for controlling the choppers such that each is substantially 120° out-of-phase with respect to the other choppers, and wherein each chopper operates at about a one-third or less duty cycle.

* * * * *